Aug. 24, 1965     L. V. BALDWIN ETAL     3,202,915
PARTICLE BEAM MEASUREMENT APPARATUS USING BEAM KINETIC
ENERGY TO CHANGE THE HEAT SENSITIVE RESISTANCE OF
THE DETECTION PROBE
Filed June 19, 1961                    2 Sheets-Sheet 1
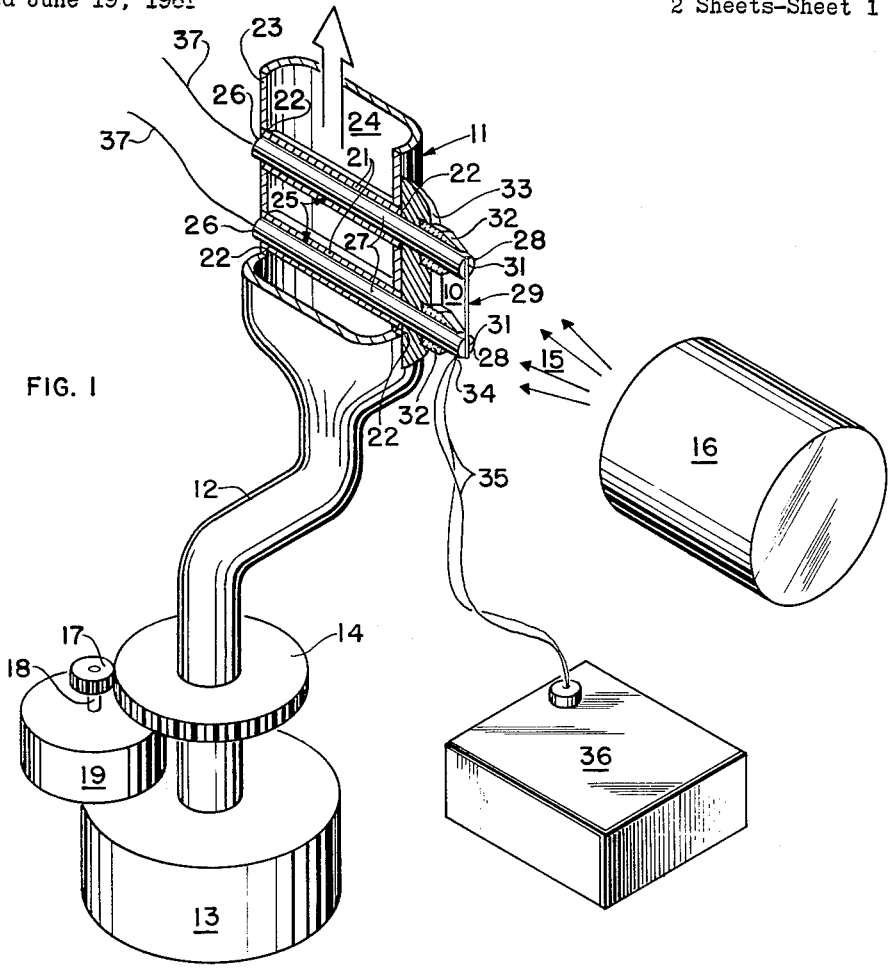
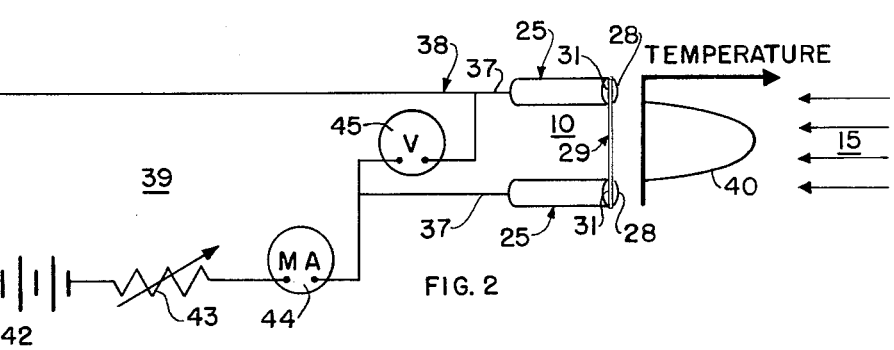
INVENTOR
LIONEL V. BALDWIN
VIRGIL A. SANDBORN
BY
ATTORNEY

INVENTOR
LIONEL V. BALDWIN
VIRGIL A. SANDBORN

ATTORNEY

United States Patent Office 3,202,915
Patented Aug. 24, 1965

3,202,915
PARTICLE BEAM MEASUREMENT APPARATUS USING BEAM KINETIC ENERGY TO CHANGE THE HEAT SENSITIVE RESISTANCE OF THE DETECTION PROBE
Lionel V. Baldwin, Berea, and Virgil A. Sandborn, North Olmsted, Ohio, assignors to the United States of America as represented by the Administrator of the National Aeronautics and Space Administration
Filed June 19, 1961, Ser. No. 118,203
3 Claims. (Cl. 324—106)
(Granted under Title 35, U.S. Code (1952), sec. 266)

The invention described herein may be manufactured and used by or for the Government of the United States of America for governmental purposes without the payment of any royalties thereon or therefor.

This invention relates generally to particle beam density detecting devices and, more particularly, to an apparatus for point or local particle beam power density detection and measurement.

One source of high-energy particle beams is the ion rocket engine. In an ion rocket a propellant, such as cesium or rubidium, is ionized and accelerated by an electrostatic field. The ion beam is then exhausted at about 20,000 to 200,000 meters per second into a neutralization region where ideally an equal current of electrons is injected into the beam to eliminate space charge outside the rocket. Research with experimental ion rocket engines requires the detection and measurement of ion-beam momentum, power density, velocity, and current density (or mass-flow rate per unit area). These are interdependent quantities, and the measure of two of these quantities will permit calculation of the remaining values. The ions from the engine ionizer emerge at a velocity (except for charge exchange ions) dependent upon the fixed positive potential at the ion emitter to ground potential outside the engine; thus, ion velocities can be determined from the measurement of emitter voltage. Measurement of the ion beam power density in combination with knowledge of ion velocity permits accurate computation of current density or mass-flow rate per unit area.

Devices commonly utilized for particle beam power density measurement are electrical meters such as the ordinary galvanometer or conventional steady-state thermal resistance calorimeters. Although these devices perform satisfactorily under controlled conditions, they have certain undesirable features. Electrical meters, for example, are adversely influenced by secondary electrons migrating back to the ion engine, resulting in the introduction of errors in the measurement of ion beam power density. Additionally, electrical meters can only be relied upon to provide an accurate measurement of the overall or average values of the beam power density. The thermal resistance calorimeter, because of its relatively large size, tends to distort the particle beam and similarly is only capable of providing a measurement of the average or overall value of beam power density. Consequently, the aforementioned present day devices are found to be somewhat unsuitable to provide for local or point detection and measurement of particle beam density.

Detailed surveying of diverse points across the particle beam of an ion engine is necessary for checking component functioning within the rocket, such as for example, the ion emission variation from surface ionizers or the beam focusing of the electrostatic accelerators and for determining magnitude and location of beam power peaks. Even more important is the use of detailed beam surveys in studies of space charge neutralization in that the spreading of the ion beam downstream of the exit of the accelerator is a quantitative measure of the effectiveness of the space charge neutralization.

Local or point detection and measurement devices such as the hot-wire anemometer have been employed as airflow measuring devices, resistance thermometers, and vacuum gages. In each case, the property of heat transfer between the wire and surrounding fluid is the phenomenon being sensed. In all these cases, the phenomenon of heat transfer by conduction to the wire supports is regarded as a source of error in the measurement and is, therefore, kept to a minimum. Furthermore, the use of a conventional hot-wire probe for detecting and measuring point or local particle beam density is exceedingly limited because of wire destruction resulting from a combination of high temperatures arising from conversion of particle beam kinetic energy to heat and lack of adequate heat dissipation.

Accordingly, one object of this invention is to provide an apparatus for detecting and measuring point values of particle beam density.

Another object of the invention is to provide an apparatus and technique for determining the spreading of a particle beam.

Still another object of the present invention is to provide an apparatus for detection and measurement of power density peaks in particle beams.

A further object of the instant invention is to provide an apparatus of small size for detection and measurement of particle beam power density.

A still further object of the invention is to provide an apparatus which does not influence particle beam power density measurements.

According to the present invention, the foregoing and other objects are obtained by surveying a particle beam with a probe consisting of a detecting wire positioned on electrically and thermally conductive rods and having provision for maintenance of the detecting wire extremities at a substantially constant temperature.

A more complete appreciation of the invention and many of the attendant advantages thereof will be readily appreciated as the same becomes understood by reference to the following detailed description when considered in connection with the accompanying drawing wherein:

FIG. 1 is a perspective view, partly in section, of one embodiment of the detector assembly of the instant invention.

FIG. 2 is a schematic view of an electrical measuring circuit utilizing the detecting probe of the invention.

Figure 3:
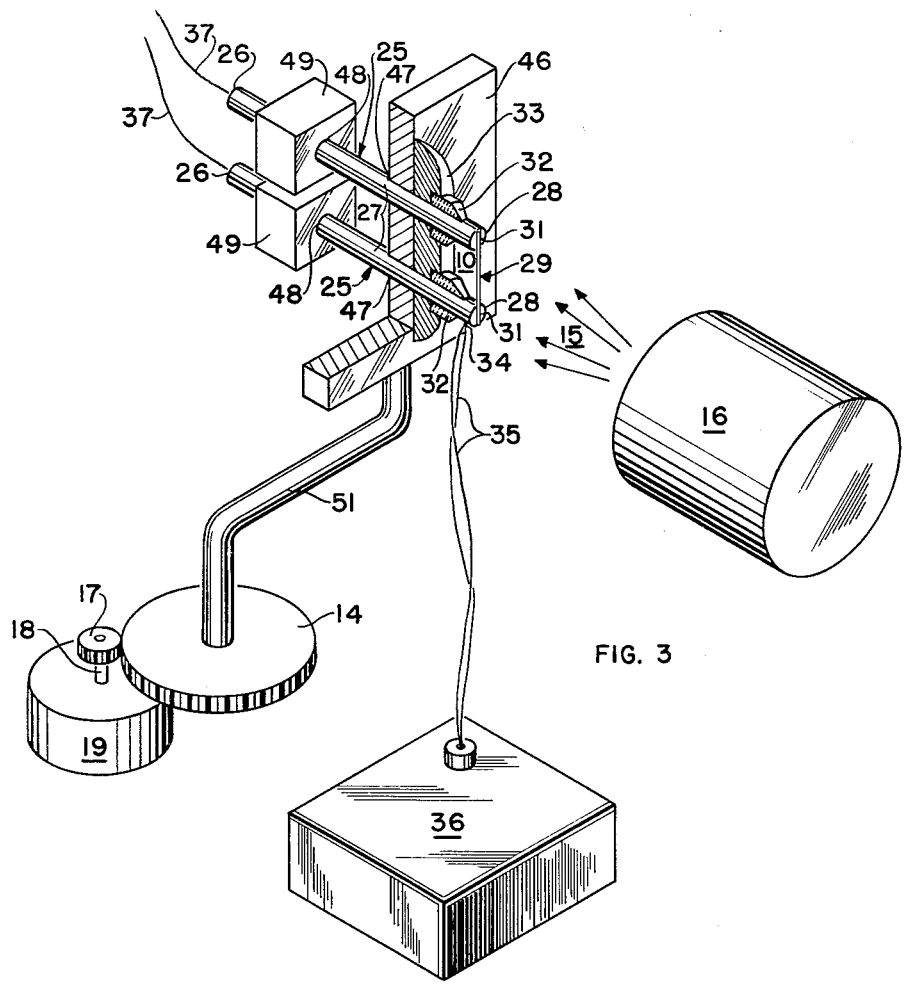
FIG. 3 is a perspective view, partly in section, of an alternative embodiment of the detector assembly of the invention.

Referring now to the drawings wherein like reference numerals designate identical or corresponding parts throughout the several views and, more particularly, to FIG. 1 wherein is disclosed a detector assembly consisting of a detector probe 10 supported by an elliptical tubular housing 11 connected to one end of a conduit member 12, the other end of which is connected to a pressurized coolant source 13. A spur gear 14 is attached to the other end of the conduit member 12 near the pressurized coolant source 13. The conduit member 12 is so formed that rotation of the gear 14 about its axis will cause the probe 10 to traverse an arc type path across a particle beam 15 emanating from an ion engine source 16. The gear 14 may be rotated by a smaller intermeshing gear 17 mounted on a shaft 18 of a driving motor 19.

The housing 11 is positioned on the conduit member 12 with respect to the particle beam 15 so as to allow impingement of the particle beam 15 on the minimum curvature portion of the elliptically-shaped housing 11, thereby providing for a minimum frontal exposure to the particle beam 15. A pair of tubular members 21 are inserted through apertures 22 formed in the minimum curvature portion of the housing 11 and are positioned such that the ends thereof terminate flush with the external surface 23 of the housing 11. The tubular members 21 are secured to the housing 11 by brazing, cementing, or the like so as to insure a vacuum tight seal to prevent leakage of coolant 24 passing through the housing 11 for a purpose to be hereafter explained. The housing 11 and tubular members 21 may be fabricated out of any workable material such as copper or the like, although for experiments involving neutralization of the particle beam 15, the housing 11 is preferably made of an electrical insulating material such as glass so as to prevent the housing 11 from acting as a direct current electron source.

The probe 10 is comprised of a pair of parallel spaced rod members 25 having inner ends 26, intermediate portions 27, and outer ends 28 and a detecting wire or element 29 having the extremities 31 thereof fastened to the outer ends 28. The rod members 25 are fabricated of a material having the characteristics of thermal and electrical conductivity such as for example copper, gold, silver, or the like and are coated with varnish where contact with the housing 11 or parts connected thereto is made so as to provide for a high electrical resistance therebetween. The detecting wire 29 is formed of a material having the characteristics of an electrical conductor, or semiconductor, and a thermal conductivity matched to the particle beam kinetic energy to provide for accurately measurable changes in wire resistance. A detecting wire of a platinum-iridium alloy is satisfactory for most purposes and has the feature of being easily secured to the outer ends 28 of the rod members 25 by soft soldering or the like. Although the detecting element 29 is shown as a wire in the form of a cylinder, it is not to be regarded as geometrically restrictive as almost any solid surface, when placed in a high-energy particle beam, has the ability to convert beam kinetic energy into heat. The rod members 25 are inserted through the tubular members 21 and are positioned such that the inner ends 26 terminate flush with the external surface 23 of the housing 11 and the outer ends 28 terminate without the housing 11. Ceramic tubes 32 having the forward ends thereof tapered are fitted on the portions of the rods 25 which terminate without the housing 11 to reduce rod area exposure to the particle beam 15. This is very effective in reducing secondary electron emission which may arise from particle beam impingement on the rods. The rods 25 and ceramic tubes 32 are securely fastened to the housing 11 and relative to each other by utilizing an epoxy resin cement 33.

Immersion of the detecting wire 29 within the particle beam 15 results in impingement of the particle beam thereon and consequential conversion of particle beam kinetic energy into heat. This heat which would ordinarily cause destruction of the detecting wire 29 flows by conduction from the detecting wire extremities 31 into the outer ends 28 of the rod members 25 and by further conduction through the intermediate portions 27 into the tubular members 21. Coolant 24, such as water or the like, originating from the pressurized coolant source 13 flows through the tubular conduit member 12 into the housing 11 and over the tubular members 21. The coolant 24 dissipates the heat conducted to the tubular members 21 from the detecting wire extremities, thereby maintaining the temperature thereof substantially constant and preventing destruction of the detecting wire 29. After passing through the housing 11, the coolant 24 may be discharged into a storage container (not shown) via another conduit member (not shown). In instances where coolant flow is inadequate for dissipating the conducted heat, a temperature sensing device such as a thermocouple or thermistor 34 may be mounted in the outer end 28 of one of the rods 25 so as to monitor the rod temperature. For all practical purposes, it may be assumed that detector wire extremity temperature and rod outer end temperature are of the same value. Leads 35 from the temperature sensing device 34 are attached to a temperature recording instrument 36 to provide monitored temperature values for correcting beam power density measurements. Conductors 37 are affixed to rod inner ends 26 to provide a connection to an electrical measuring circuit.

Utilization of the instant invention is best shown with reference to FIG. 2 wherein is disclosed a particle beam density measuring system 38 comprised of the detecting element 29 and detecting element rod support members 25 connected serially to an electrical circuit 39 through conductors 37. In operation, the local or point particle beam power detection and measurement would be obtained in the following manner. The detecting element 29 is immersed within the particle beam 15 at a desired location for obtaining a local value of particle beam density. Impingement of the particle beam 15 on the detecting element 29 results in the conversion of beam kinetic energy into heat. The heat flows by conduction into the outer ends 28 of the rod supports 25 which have provision for cooling in a manner as mentioned in reference to FIG. 1. Because the rod supports 25 and consequently detecting element extremities 31 are maintained at a substantially constant temperature by the coolant flow, the detecting element will have a temperature profile 40, as shown, and an associated detecting element electrical resistance. A variation of particle beam density results in a variation of detecting element temperature level profile, thus effecting a change in the electrical resistance of the detecting element.

The change in resistance of element 29 may be utilized, as is well known in the art, with either of two modes of detecting element operation; i.e. constant current or constant temperature. For example, in one method of constant current operation, the electrical circuit 39 may consist of a unidirectional energy source, such as a battery 42, a current control resistor 43, and a milliammeter 44 serially connected with the conductors 37. The current control resistor 43 is dependently operated with the milliammeter 44 so as to maintain a constant current through the particle beam density measuring system 38. By maintaining a constant current, the changes in the resistance of the detecting element 29 due to temperature level profile changes are detected as a voltage change through a voltmeter 45 shunt connected across the conductors 37. A theoretical treatment of the detecting element heat conduction to the rod members 25 as a one-dimensional thermal conduction problem having as a boundary, a substantially constant detecting element temperature at the extremities thereof, results in an analysis directly relating voltage output of the voltmeter 45 to particle beam power.

The area of local or point particle beam power measurement is determined only by the size of the detecting element 29 mounted on the rod members 25. In practice, a relatively small-sized detecting element in the form of a wire having a diameter and length of 0.001 and 0.5 centimeter, respectively, has been successfully utilized. By traversing the probe 10 across the beam 15, and measuring voltage output of the detecting element at preselected points, a detailed beam survey may be obtained.

Detailed surveys of an ion engine beam are utilized in checking component functioning within the ion source an ion accelerator. For example, the ion emission variation from surface ionizers or the beam focusing of the electrostatic accelerators may be determined. Another important use of detailed surveys may be found in determining the amount of beam spreading and, thus, effectiveness of space charge neutralization. The size of the detecting element 29 makes it attractive for this application because great care must be taken to minimize the interference of the measuring device with the ion beam. In addition, the small size of the detection element 29 makes it possible to isolate beam power peaks which would otherwise be averaged out with conventional detecting apparatus, Where the use of a liquid coolant for dissipating detecting wire heat is not desired, FIG. 3 shows an alternative embodiment wherein is shown a support plate member 46 having apertures 47 formed perpendicularly therein. The plate member 46 is formed arbitrarily as a square and is fabricated of the material utilized for the housing 11, as previously discussed with reference to FIG. 1. The rods 25 of the probe 10 pass through the apertures 47 and through openings 48 formed in a pair of heat sinks 49. The heat sinks 49 may be fabricated of the same type of material utilized for the rods 25 and may be secured thereto by tight fitting, brazing, or the like. The plate member 46 is made large enough so as to shield the heat sinks 49, rod inner ends 26, and rod intermediate portions 27 from the particle beam 15, and is mounted on a solid bar 51 for positioning the probe 10 within the particle beam 15 at preselected points. A spur gear 14 is secured to one end of the bar 51 which is so formed as to provide for probe movement across the particle beam 15 by rotation of gear 14 about its axis.

In operation, the detecting wire 29 is immersed within the particle beam 15. Impinging particles of the beam 15 on the detecting wire 29 results in a conversion of beam kinetic energy into heat. Detecting wire destruction is prevented and the extremities thereof are maintained at a substantially constant temperature through conduction of detecting wire heat into the outer ends 28 of the rods 25. The aforementioned heat is then conducted through the rods and dissipated both by conduction to the heat sinks 49 and by the combined radiation from the heat sinks 49 and the inner ends 26 of the rods 25. For applications wherein the detecting wire heat conduction into the outer ends 28 of the rods 25 is of the same order of magnitude as that dissipated by radiation from the inner ends 26 and intermediate portions 27, the detector assembly may be utilized without the heat sinks 49. Additionally, if the time duration of detection wire exposure to the particle beam is short, the intermediate portions 26 themselves may be utilized as heat sinks. Electrical leads connected between the conductors 37 and an appropriate electrical circuit enables the determination of beam density, as discussed in reference to FIG. 2. In applications where the heat cannot be completely dissipated, thus resulting in a temperature rise of the detector element ends, a temperature sensing device 34 is mounted in one of the rods 25 to monitor for possible support heating. Leads 35 from the temperature sensing device are attached to a temperature recording instrument 36 for the purpose aforementioned with reference to FIG. 1.

From the foregoing explanation, it is readily apparent how the instant invention, because of the relatively small size of the detecting element, enables measurement of local values of particle beam density and particle beam spreading with negligible distortion of the particle beam. In addition, by integrating point or local values of beam density over a beam survey, total or overall beam power density may be determined independently of the particle beam source, thus avoiding the introduction of beam measurement errors due to secondary electrons migrating back to the particle beam source. It is also readily apparent to those skilled in the art that in addition to steady-state measurements of local values of particle beam density, the small mass of the detecting element and its associated short time constant enables the measurement of transient beam power fluctuations. Although the invention and its attendant advantages have been related particularly to ion engine particle beams, it is obvious that the instant invention has application to measurements of any similar particle beam.

Obviously, many modifications and variations of the present invention are possible in the light of the above teachings. It is, therefore, to be understood that within the scope of the appended claims the invention may be practiced other than as specifically described.

What is claimed is:
1. A particle beam power density measuring system comprising, a probe immersible in a particle beam, said probe being formed of a pair of spaced rods of electrical and thermal conductivity having the outer ends thereof exposed to said particle beam detecting means having the extremities thereof securely fastened to said outer ends for converting the kinetic energy of said particle beam into heat, tubular means for supporting said probe within said particle beam, means for dissipating heat conducted into said outer ends of said rods from said detecting means, thereby maintaining the extremities of said detecting means at a substantially constant temperature and preventing destruction of the detecting means, and means connected to said probe responsive to the electrical resistance variations of said detecting means for developing an electrical signal indicative of the local power density of said particle beam.

2. A particle beam power density measuring system comprising, a probe immersible in a particle beam, said probe being formed of a pair of spaced rods of electrical and thermal conductivity having the outer ends thereof exposed to said particle beam and a detecting wire having its extremities securely fastened to said outer ends for converting the kinetic energy of said particle beam into heat, tubular means for supporting said probe within said particle beam, a liquid coolant, means for effecting the flow of said liquid coolant through said tubular means, whereby heat conducted into said outer ends of said rods from said detecting wire extremities is dissipated, thereby maintaining the detecting wire extremities at a substantially constant temperature and preventing destruction of the detecting wire, and means connected to said probe responsive to the electrical resistance variations of said detecting wire for developing an electrical signal indicative of the local power density of said particle beam.

3. A particle beam power density measuring system comprising, a probe immersible in a particle beam, said probe being formed of a pair of spaced rods of electrical and thermal conductivity having the outer ends thereof exposed to said particle beam and a detecting wire having its extremities securely fastened to said outer ends of said rods for converting the kinetic energy of said particle beam into heat, support means for positioning said probe within said particle beam, heat sink means separately secured to said rods for dissipation of heat conducted into said outer ends of said rods from said detecting wire extremities, thereby maintaining the detecting wire extremities at a substantially constant temperature and preventing destruction of the detecting wire, and means connected to said probe responsive to the electrical resistance variations of said detecting wire for developing an electrical signal indicative of the local power density of said particle beam.

References Cited by the Examiner

UNITED STATES PATENTS

| 2,054,382 | 9/36 | Larsen | 73—362 |
|---|---|---|---|
| 2,564,626 | 8/51 | Macmahon | 250—83.1 |
| 2,745,284 | 5/56 | Fitzgerald | 250—83 |
| 2,781,452 | 2/57 | Lofgren | 250—41.9 |
| 2,981,913 | 4/61 | Barnes | 250—83.3 |

WALTER L. CARLSON, *Primary Examiner.*
BENNETT G. MILLER, *Examiner.*